United States Patent [19]

Massara

[11] Patent Number: 5,722,722
[45] Date of Patent: Mar. 3, 1998

[54] VEHICLE SEAT ENERGY ABSORBER

[75] Inventor: Andrew J. Massara, Vargön, Sweden

[73] Assignee: Lear Corporation, Southfield, Mich.

[21] Appl. No.: 782,404

[22] Filed: Jan. 14, 1997

[51] Int. Cl.⁶ .................................................... B60N 2/42
[52] U.S. Cl. ............................ 297/216.13; 297/216.14
[58] Field of Search .......................... 297/216.1, 216.13, 297/216.14, 362.11, 362.14, 378.12

[56] References Cited

U.S. PATENT DOCUMENTS

| | | | |
|---|---|---|---|
| 3,761,127 | 9/1973 | Giese et al. | 297/216.1 X |
| 5,290,089 | 3/1994 | Oleszzo et al. | 297/216.14 |
| 5,320,308 | 6/1994 | Bderikjian et al. | 297/216.1 X |
| 5,370,440 | 12/1994 | Rogala | 297/216.14 |
| 5,454,622 | 10/1995 | Demopoulos | 297/216.14 |
| 5,597,205 | 1/1997 | Glance et al. | 297/362.14 |

*Primary Examiner*—Peter R. Brown
*Attorney, Agent, or Firm*—Brooks & Kushman P.C.

[57] ABSTRACT

A vehicle seat assembly includes a seat track or lower seat frame, and a seat back pivotally connected with respect to the seat track. A recliner mechanism is secured between the seat back and seat track for adjusting the angle of the seat back with respect to the lower seat track. A damper mechanism is secured between the seat back and seat track. The recliner mechanism is disengageable in a high energy impact, thereby allowing the damper mechanism to dissipate energy as the seat back pivots with respect to the seat track.

17 Claims, 2 Drawing Sheets

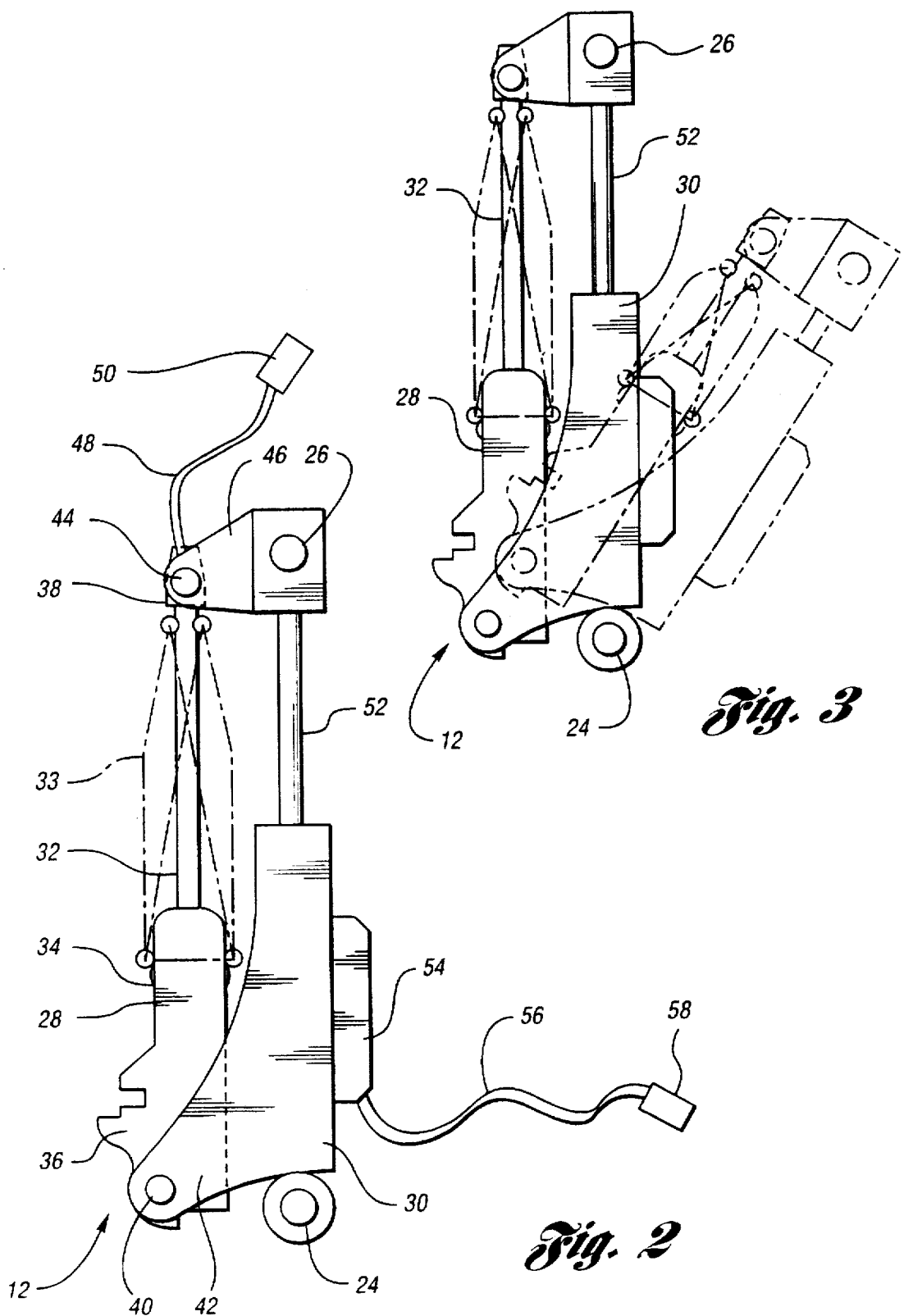

1

VEHICLE SEAT ENERGY ABSORBER

TECHNICAL FIELD

The present invention relates to a recliner and energy absorption assembly adapted for attachment between a seat back and seat track for reclining the seat back and for dissipating energy of the seat back with respect to the lower seat frame in a high energy impact.

BACKGROUND OF THE INVENTION

In a high energy impact, large impact forces may be delivered to the occupant by the seat in both a rearward or frontal impact. In a rearward impact, the occupant is forced against the seat, and may experience a large energy pulse. Similarly, in a forward impact, in vehicle seats which incorporate the belt restraint system directly into the seat back, the occupant will engage the restraint system, and therefore may receive a large energy pulse from the seat which supports this restraint system.

Accordingly, it is desirable to provide a vehicle seat assembly which is adapted to dissipate energy of an occupant in a high energy impact to prevent the occupant from experiencing an excessive energy pulse during deceleration.

DISCLOSURE OF THE INVENTION

As a result of Lear Corporation's continuing efforts to improve vehicle safety, the present invention overcomes the above-referenced shortcomings of prior art seat assemblies by providing a combined seat recliner and damper system in which the recliner mechanism is disengageable in a high energy impact, thereby allowing the damper mechanism to dissipate energy as the seat back pivots with respect to the seat track.

More specifically, the present invention provides a vehicle seat assembly, including a seat track, a seat back pivotally connected with respect to the seat track, and a recliner mechanism secured between the seat back and seat track for adjusting the angle of the seat back with respect to the seat track. A damper mechanism is also secured between the seat back and seat track. The recliner mechanism is configured to be disengageable in a high energy impact, thereby allowing the damper mechanism to dissipate energy as the seat back pivots with respect to the seat track.

In a preferred embodiment, the damper mechanism and recliner mechanism are connected in a substantially parallel relationship with respect to each other, and the recliner mechanism includes a releasable clevis pin securing it to the damper mechanism. The clevis pin may be explosively released when a high energy impact is sensed, thereby disengaging the recliner mechanism from the damper mechanism to allow the damper mechanism to dissipate energy of the seat back as it pivots with respect to the seat track.

Accordingly, an object of the present invention is to provide a vehicle seat assembly which incorporates capability for damping energy of the seat back as it pivots with respect to the seat track in a high energy impact.

Another object of the present invention is to provide a combined recliner mechanism and damper mechanism between the seat back and seat track, wherein the recliner mechanism is selectively disengageable from the damper mechanism in a high energy impact to allow the damper mechanism to dissipate energy.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 shows a side view of a recliner and damper assembly in accordance with the embodiment shown in FIG. 1; and FIG. 3 shows the damper and recliner assembly of FIG. 2, with the same assembly shown pivoted in phantom.

DETAILED DESCRIPTION OF THE PREFERRED EMBODIMENT

Figure 1:
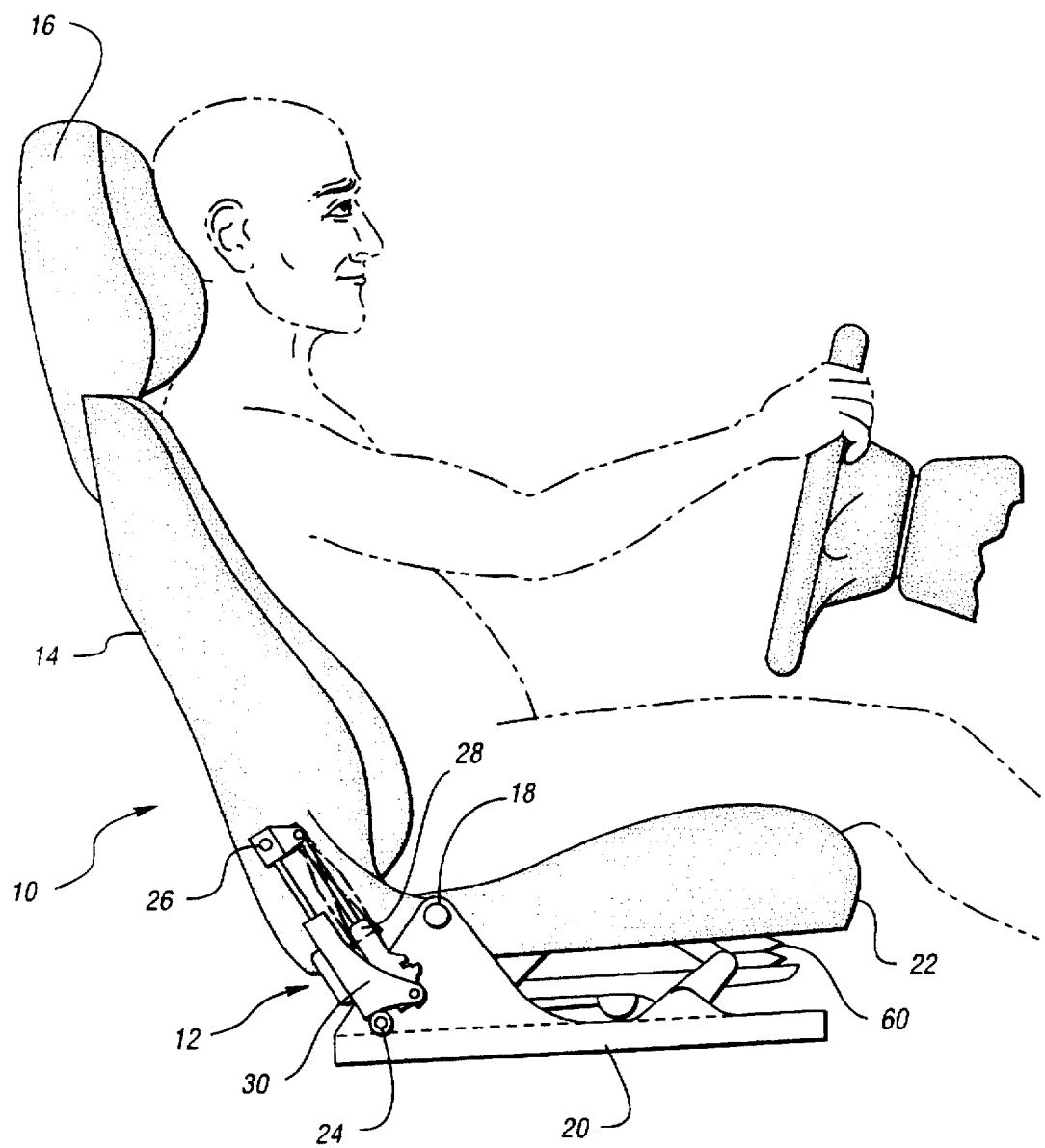
FIG. 1 shows a side view of a vehicle seat assembly incorporating a recliner and damper assembly in accordance with the present invention.

Referring to FIG. 1, a vehicle seat assembly 10 is shown incorporating a recliner/damper assembly 12 in accordance with the present invention. The seat assembly 10 includes a seat back 14 having a head rest 16 mounted thereto. The seat back 14 is pivotally mounted at the pivot joint 18 to the track or lower seat frame member 20.

The recliner/damper assembly 12 includes a lower structural attachment point 24 which is pivotally secured to the seat track 20, and an upper structural attachment point 26, which is pivotally secured to the seat back 14. In this configuration, the recliner mechanism 28 may be used to adjust the angle of the seat back 14 with respect to the lower seat track 20 because the recliner mechanism 28 is connected integrally with the damper mechanism 30. The damper mechanism 30 does not prevent smooth adjustment of the seat back angle 14 by the recliner mechanism 28 in that it is configured to dampen large energy pulses in a high energy impact.

Turning to FIG. 2, the recliner/damper assembly 12 is more clearly shown. The recliner mechanism 28 preferably comprises a linear actuator incorporating a rod 32 and housing 34, such as in a commercially available PL Porter-type mechanism. The housing 34 includes a plurality of springs therein for locking the rod 32 in a desired linear position.

As shown in FIG. 2, the recliner mechanism 28 is positioned in substantially parallel relationship with respect to the damper mechanism 30. The recliner mechanism 28 includes opposing ends 36, 38, with the first end 36 being attached at the joint 40 to the damper housing 42, and the second end 38 being connected by the clevis pin 44 to the clevis 46, which is secured to the upper structural attachment point 26. The recliner mechanism 28 also includes a return spring 33 which is operative to bias the seat back 14 to pivot toward the seat track 20.

The clevis pin 44 includes a squib release mechanism which is activated through the squib release signal control harness 48 and connector 50. The squib release mechanism comprises an explosive device which deploys when a high energy impact is sensed by remote vehicle sensors. When the clevis pin 44 is explosively disengaged from the clevis 46, the damper mechanism 30 is free to absorb energy as the seat back 14 pivots with respect to the seat track 20.

The damper mechanism 30 is preferably a variable/bidirectional damper, such that movement of the rod 52 with respect to the damper housing 42 is damped in compression or extension. Also, the damper mechanism 30 will provide different damping behavior in the forward and rearward directions. As the seat back 14 is pivoting forward-invehicle, only approximately 5 degrees of pivotal movement is available for damping, while approximately 45 degrees of pivotal movement is available for damping as the seat back 14 pivots rearward-in-vehicle.

The damper mechanism 30 also includes a damping ratio actuator 54, including a harness 56 and connector 58, for adjusting the damping ratio based upon the sensed weight of the vehicle occupant. The weight may be sensed by measuring the pressure of the bladder 60, shown in FIG. 1, or by other available weight measurement means. The damping ratio and damping curves will also be adjusted based upon the seat back angle.

Turning to FIG. 3, the same recliner/damper assembly 12 is shown, and the assembly is shown pivoted in phantom. As the assembly is pivoted, the recliner mechanism 28 and damper mechanism 30 maintain a substantially parallel relationship, and the rods 32, 52 are compressed or extended.

Accordingly, in this configuration, in a high energy impact, the recliner mechanism 28 will be detached from the damper mechanism 30, thereby allowing the preset damper 30 to energy manage. The damping ratio will be set according to the occupant weight, as measured by the seat system upon ingress. The damper mechanism 30 will reduce the impact forces delivered to the occupant by the seat assembly by damping the transfer mechanism. In a rear impact, the seat back 14 will deflect backward, absorbing energy in the damper, and in a frontal impact (with the belt incorporated into the seat back), the damping will be in the opposite direction. The damper 30 is bidirectional (compression/extension) and variable (i.e., adjustable for different damping ratios).

This concept of a damper mechanism with a disengageable recliner mechanism could be embodied in many different configurations, and the embodiment described above is one possible configuration. Accordingly, while the best mode for carrying out the invention has been described in detail, those familiar with the art to which this invention relates will recognize various alternative designs and embodiments for practicing the invention within the scope of the appended claims.

What is claimed is:

1. A vehicle seat assembly, comprising:

a seat track component;

a seat back component pivotally connected with respect to the seat track component;

a recliner mechanism secured between the seat back component and seat track component for adjusting the angle of the seat back component with respect to the seat track component; and a damper mechanism secured between the seat back component and seat track component;

wherein the recliner mechanism is disengageable from one of the seat components in a high energy impact, thereby allowing the damper mechanism to dissipate energy as the seat back component pivots with respect to the seat track component.

2. The vehicle seat assembly of claim 1, wherein said damper mechanism comprises opposing ends pivotally attached to the seat back component and seat track component, respectively, and wherein the recliner mechanism is removably secured to the damper mechanism.

3. The vehicle seat assembly of claim 2, wherein one end of said recliner mechanism comprises a releasable clevis pin securing the recliner mechanism to the damper mechanism, and said assembly further comprises a squib release mechanism for explosively disengaging said clevis pin when a high energy impact is sensed.

4. The vehicle seat assembly of claim 3, further comprising a clevis member connecting the clevis pin with one of said opposing ends of the damper mechanism.

5. The vehicle seat assembly of claim 1, further comprising a spring positioned on said recliner mechanism for biasing the seat back component toward the seat track component.

6. The vehicle seat assembly of claim 1, further comprising a mechanism for adjusting the damping ratio of the damper, mechanism based upon the weight of the vehicle occupant.

7. The vehicle seat assembly of claim 1, wherein said recliner mechanism is positioned in a substantially parallel relationship with respect to said damper mechanism.

8. The vehicle seat assembly of claim 1, wherein said damper is configured to dissipate energy in compression and extension for energy dissipation in forward and rearward impacts.

9. A recliner and energy absorption assembly for a vehicle seat assembly including a seat back component and seat track component, comprising:

a recliner mechanism adapted for attachment between the seat back component and seat track component for adjusting the seat back component angle with respect to the seat track component; and a damper mechanism adapted for attachment between the seat back component and seat track component;

wherein the recliner mechanism is disengageable from one of the seat components in a high energy impact, thereby allowing the damper mechanism to dissipate energy as the seat back component pivots with respect to the seat track component.

10. The recliner and energy absorption assembly of claim 9, wherein said damper mechanism comprises opposing ends adapted for pivotal attachment to the seat back component and lower seat track component, respectively, and wherein the recliner mechanism is secured to the damper mechanism.

11. The recliner and energy absorption assembly of claim 10, wherein one end of said recliner mechanism comprises a releasable clevis pin securing the recliner mechanism to the damper mechanism, and said assembly further comprises a squib release mechanism for explosively disengaging said clevis pin when a high energy impact is sensed.

12. The recliner and energy absorption assembly of claim 11, further comprising a clevis member connecting the clevis pin with one of said opposing ends of the damper mechanism.

13. The recliner and energy absorption assembly of claim 9, further comprising a spring positioned on said recliner mechanism for pivotally biasing the seat back component toward the seat track component.

14. The recliner and energy absorption assembly of claim 9, further comprising a mechanism for adjusting the damping ratio of the damper mechanism based upon the weight of the vehicle occupant.

15. The recliner and energy absorption assembly of claim 9, wherein said recliner mechanism is positioned in a substantially parallel relationship with respect to said damper mechanism.

16. The recliner and energy absorption assembly of claim 9, wherein said damper is configured to dissipate energy in compression and extension for energy dissipation in forward and rearward impacts.

17. A vehicle seat assembly, comprising:

a seat track;

a seat back pivotally connected with respect to the seat track;

a recliner mechanism secured between the seat back and seat track for adjusting the angle of the seat back with respect to the seat track; and a damper mechanism secured between the seat back and seat track;

wherein the recliner mechanism comprises a releasable pin securing the recliner mechanism to the damper mechanism, whereby the recliner mechanism is disengageable from the damper mechanism in a high energy impact to allow the damper mechanism to dissipate energy as the seat back pivots with respect to the seat track.

* * * * *